Jan. 14, 1958
H. W. KUGLER ET AL
2,819,717
SURGICAL SKIN-TREATING DEVICE
Filed Aug. 3, 1956
3 Sheets-Sheet 2
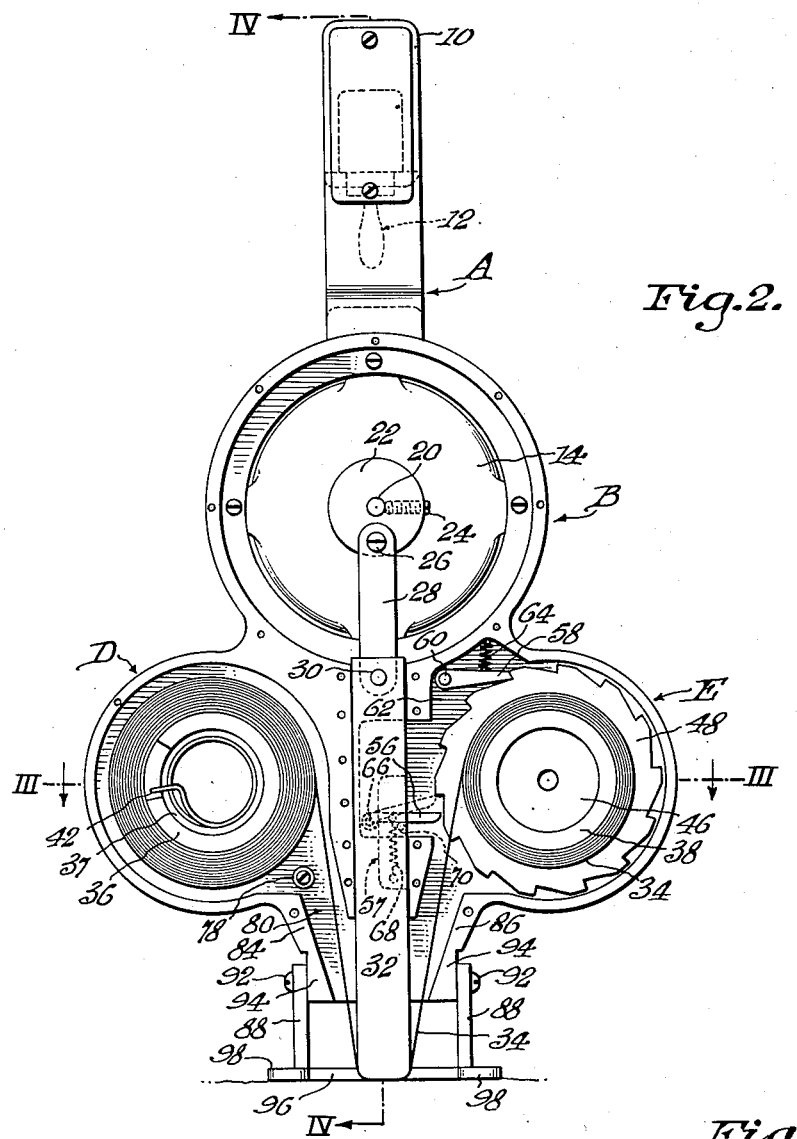
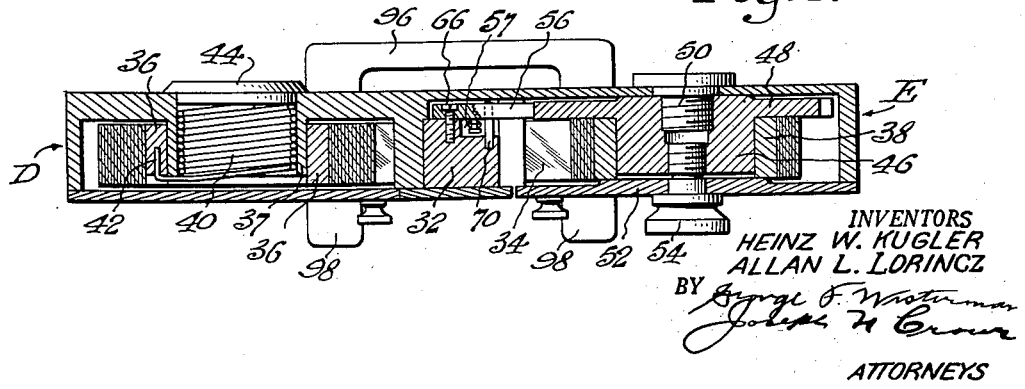
INVENTORS
HEINZ W. KUGLER
ALLAN L. LORINCZ
ATTORNEYS Jan. 14, 1958 H. W. KUGLER ET AL 2,819,717
SURGICAL SKIN-TREATING DEVICE
Filed Aug. 3, 1956 3 Sheets-Sheet 3

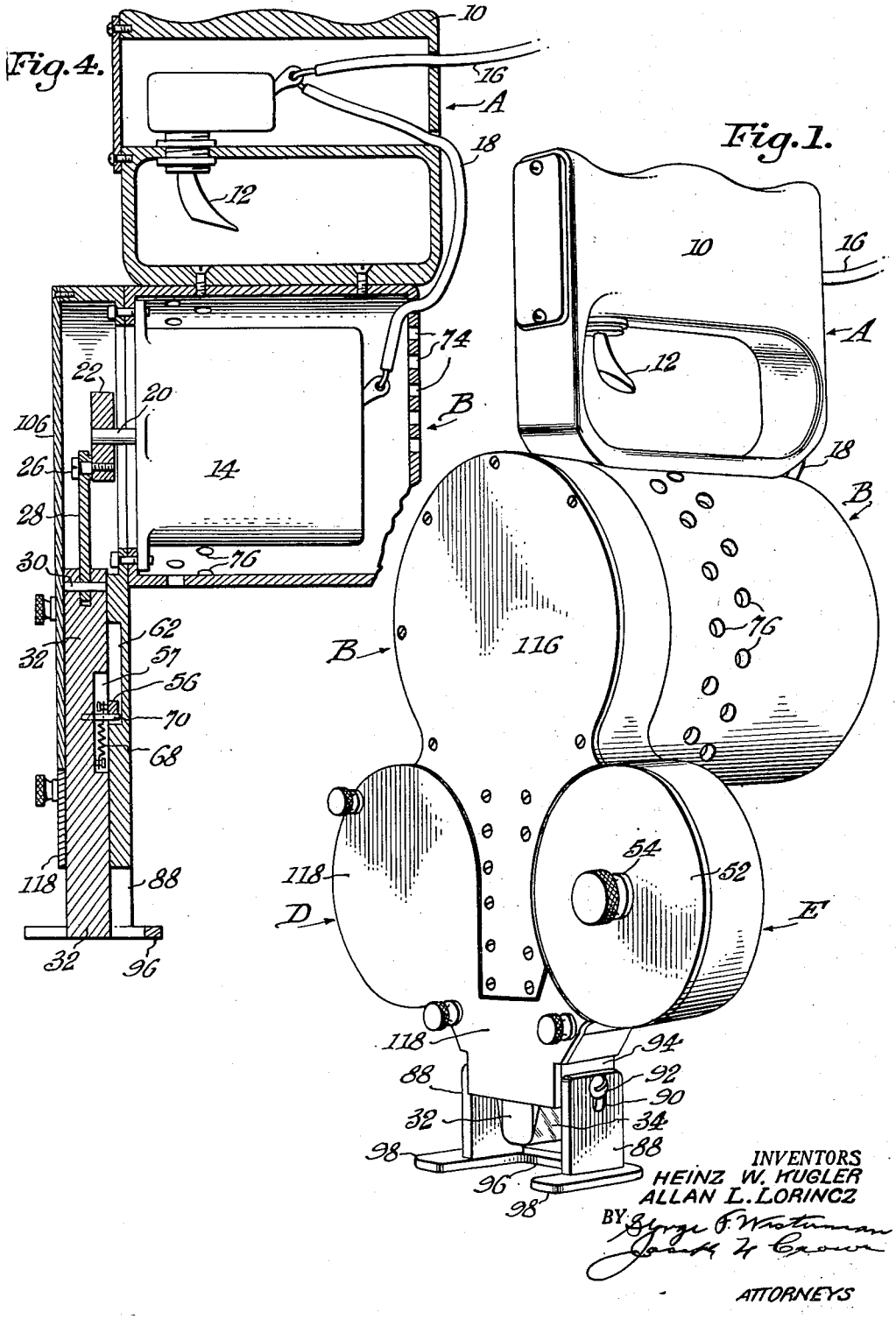

INVENTORS
HEINZ W. KUGLER
ALLAN L. LORINCZ
BY
ATTORNEYS

United States Patent Office 2,819,717
Patented Jan. 14, 1958

2,819,717

SURGICAL SKIN-TREATING DEVICE

Heinz W. Kugler, College Park, and Allan L. Lorincz, Silver Spring, Md.

Application August 3, 1956, Serial No. 602,089

4 Claims. (Cl. 128—303)

(Granted under Title 35, U. S. Code (1952), sec. 266)

The invention described herein may be manufactured and used by or for the Government for governmental purposes without the payment of any royalty thereon.

The present invention relates to improvements in surgical devices and more particularly to a skin-treating machine for removing layers of skin preparatory to skin-grafting operations, and for presenting living surfaces of skin for any circumstances where such may be desired.

The improvements presented by the instant invention provide a motor driven, hand-held device for rapidly, painlessly, and conveniently stripping non-living keratinized and fluid barrier layers from localized areas of live skin by repetitive applications and removals of pressure-sensitive tape, the device of the invention being portable, light in weight, compact, and usable in any position. An area of living skin from which these layers have been so removed is characterized by a glistening, slightly moist surface, and becomes freely permeable to topically applied materials such as water and water-soluble substances. Surface applications of such materials to such stripped areas thus is tantamount to intra-epidermal as well as intra-dermal introduction of such materials. The device of the present invention, therefore, among other possible uses as a dermatologic research tool, is intended to have useful application in carrying out intra-dermal tests for allergic hypersensitivity as well as in carrying out vaccinations.

The foregoing considerations indicate the principal objects of the invention, and further objects will become apparent as the description proceeds and the features of novelty will be pointed out in particularity in the appended claims.

The invention will be understood more readily by reference to the accompanying drawings, in which—

Fig. 1 is a perspective view of an illustrative embodiment of the invention;

Fig. 2 is a front elevation of the embodiment of the invention shown in Fig. 1 but with parts removed;

Fig. 3 is a horizontal section taken on the line III—III of Fig. 2 looking in the direction of the arrows;

Fig. 4 is a vertical longitudinal section taken on the line IV—IV looking in the direction of the arrows;

Figure 5:
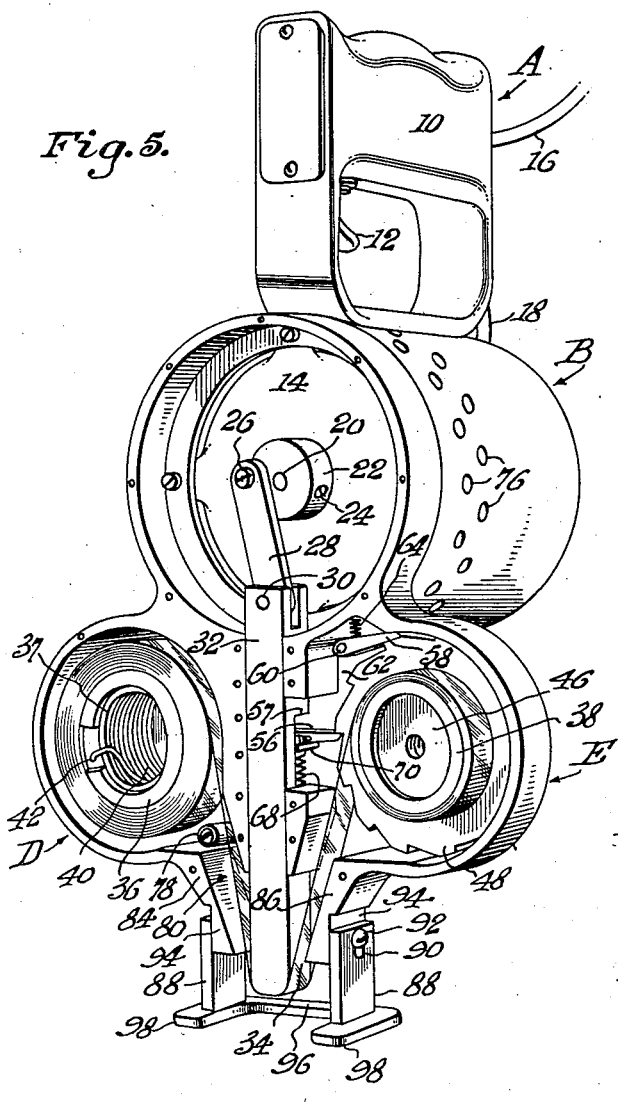
Fig. 5 is a perspective view similar to Fig. 1 but with cover plates removed.

Referring more particularly to the drawings, the present improved apparatus comprises a sectionalized housing of which section A is a hand-grip section having a handle element 10 and provided with a manually operated control switch 12 for controlling actuation of motor 14 in motor section B of the sectionalized housing, current leads 16 and 18 interconnecting a current supply source (not shown) to switch 12 and motor 14 for supplying operating current to the motor. Motor 14 rotates motor shaft 20 for rotating a cam 22 mounted on the shaft 20 and secured thereto by a locking screw 24. The cam 22 has mounted thereon by mounting screw 26 or equivalent element, a crank link or pinion arm 28, this being mounted eccentrically on the cam 22 and is pivotally connected as is indicated at 30 to a vertically reciprocatory piston or plunger 32 which bears against an uncoated side of preferably transparent "cellophane" strip 34 which is coated on its underside with a pressure-sensitive adhesive coating which is supplied from a roll 36 thereof and wound as used on a roll or spool 38 as will be described in greater detail hereinafter. The roll 36 is freely rotatably mounted on a hub 37 in a lateral housing section D, a slip spring 40 being connected to the adhesive tape-roll 36, as is indicated at 42. This slip spring 40 serves two purposes; first, it maintains tension on roll 36 by means of friction so as to control roll 36 as the tape is unwound, and second, it reverses the roll of tape to take up slack in the tape resulting from upstroke of plunger 32.

The tape 34 is received on empty reel 38 which is mounted on a hub 46 of ratchet wheel 48, enclosed in lateral housing section E. The hub 46 and ratchet 48 are of one piece and rotate with shaft 50. Cover portion 52 for the housing section E is clamped against reel 38 by a thumb-screw 54. Therefore, reel 38, hub 46, ratchet 48, shaft 50, cover 52, and thumb-screw 54 rotate together.

Plunger 32 carries a pawl 56 which turns the ratchet 48 on the upstroke of the plunger 32. A second pawl 58, pivoted on pin 60 mounted in a portion 62 in a rear cover plate of the housing and controlled by a spring 64, prevents ratchet 48 from going backwards as plunger 32 returns on the downstroke. On the downstroke of plunger 32, the pawl 56 pivots around its pivot pin mounting 66 so it can pass each tooth of the ratchet 48. When the plunger 32 ends its downstroke, a spring 68 mounted in recess 57 in the plunger, returns pawl 56 to a stop 70, which brings the pawl 56 back in position ready for the upstroke of the plunger, actuation of the pawl 56 against ratchet 48 being attained by engagement of stop 70 against the pawl 56, the stop 70 being mounted on the plunger 32.

The plunger 32 is driven by the motor 14, which conveniently may be a 100 R. P. M. motor which is air-cooled through vents 74 and 76, the motor 14 driving plunger 32 through link 28 eccentrically pivotally connected to cam 22 at 26, as aforesaid. A roller 78 is provided adjacent to the tape take-off or supply roll 36 for preventing the tape 34 from rubbing along the bottom of channel 80 which forms the space between adjacent lower elements 84 and 86 of the apparatus housing, the roller 78 being formed of suitable material such as glass or "Bakelite" for example, which is incompatible with and unaffected by the adhesive coating on the tape 34.

The operating assembly described above is mounted on a foot construction which, in service, rests upon the anatomical area of the subject, the skin of which is to be treated by the instant device. Several forms of such foot construction have been devised. One of such constructions is shown in Figs. 1, 2, and 5, by way of example. Such construction includes similar side plates 88 having elongated vertical slots 90 therein through which are passed screws 92 into off-set portions 94 of the said lower elements 84 and 86 of the housing, the side plates 88 being vertically adjustable along the screws 92 for the length of the slots 90. The side plates 88 are braced by spacing web 96 and skin-engaging pads 98 are secured to the bottom ends of side plates 88.

Figure 6:
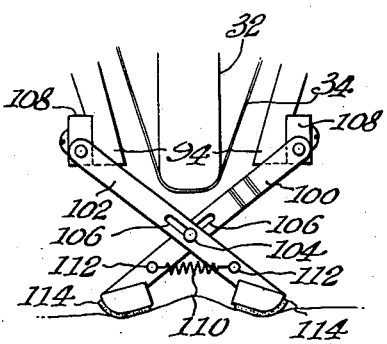
Fig. 6 is a detail elevation of a modified foot structure from that shown in the preceding views.
Figure 7:
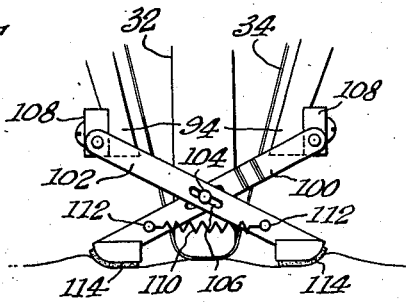
Fig. 7 is a similar view showing the foot structure of Fig. 6 in a depressed position.
Figure 8:
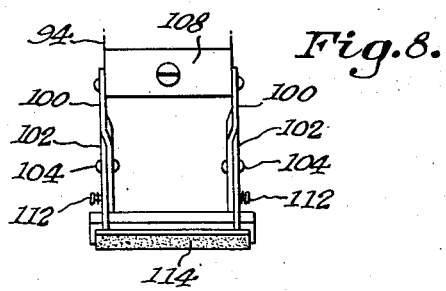
Fig. 8 is an edge view of the structure shown in Fig. 6.

A modified foot construction for the apparatus is shown in Figs. 6, 7, and 8. This foot construction was devised because it has been found in practice that if the skin is stretched during the treating ("desquamating") procedure, less than half the number of strokes of the plunger 32 are required for penetration of the barrier layer of the skin.

The foot construction shown in Figs. 6, 7, and 8 has a "scissors action" which effects the aforesaid stretching of the skin. This foot construction comprises cross arms 100, 102 pivotally connected by a pivot pin 104 secured in corresponding elongated slots 106 in the cross arms 100, 102. Corresponding upper ends of the cross arms are pivotally connected to brackets 108 on lower offset housing parts or elements 94. A coil spring 110 interconnects the lower end portions of the arms 100, 102, which normally holds the arms 100, 102, into closed or retracted position, and which has its ends connected to lugs 112 on the respective cross arms 100, 102. The lower ends of the cross arms 100, 102, are provided with rubber pads 114 which prevent slipping of the apparatus during use or damage to the skin being treated. For enabling access to be had to the working parts of the equipment, the housing is provided with removable front cover plates 116, 118, 52 for sections B, D, and E of the housing.

From the foregoing considerations, it will be seen that the present improved construction is a dermatologic research tool and it is intended to have useful application in carrying out intra-dermal tests for allergic hypersensitivity, as well as in carrying out vaccinations.

As has been pointed out above, the present equipment uses a pressure-sensitive roll of "cellophane" adhesive from which roll 36 the tape is passed around the lower end of the plunger 32 so that the adhesive side of the tape is towards the skin of the subject. The roll 36 of the tape rotates freely on hub 37, and a slip spring 40 is connected to the adhesive roll 36, this spring 40 maintaining tension on roll 36 so as to control the roll as the tape 34 is unwound therefrom, and also reversing the roll 36 to take up slack in the tape on the upstroke of the plunger 32. The plug 44 keeps the slip spring 40 in place.

The tape 34 is received by empty spool or reel 38, which is mounted on a hub 46 of ratchet 48 such being of one piece and rotating with shaft 50. Cover 52 is clamped against reel 38 by thumb-screw 54. Thus, the reel 38, the ratchet 48, the shaft 50, the cover 52, and thumb-screw 54 rotate together as a single unit. Pawl 56 is pivotally mounted on pivot pin 66 mounted on plunger 32, turning the ratchet 48 on each upstroke of the plunger 32. The second pawl 58 prevents ratchet 48 from going backwards as the plunger 32 returns on the downstroke. On the downstroke of the plunger, the pawl 56 on the plunger pivots on its pivot pin 66 so that it can pass the ratchet 48. When the plunger 32 ends its downstroke, spring 68 returns pawl 56 to a stop 70 which brings the pawl 56 back into position ready for the upstroke of the plunger 32. The plunger 32 is driven by the motor 14 which suitably may be a 100 R. P. M. motor, which is air-cooled through air vents 74 and 76 and cam 22 which is rotatably mounted on its shaft. The cam 22 reciprocably rotates link 28, the reciprocatory motion being transmitted to plunger 32. At the end of each downstroke, the adhesive coating on tape 34 is pressed by the plunger against the skin of the subject over an area corresponding to the area of the end of the plunger. On its upstroke, the plunger 32 operates the pawl 46 to wind the strip after its application to the subject's skin, onto spool 38, the tape being maintained tautly against the end of the plunger by spring 46 reversing rotation of the roll 36 during the upstrokes of the plunger. As to the foot assembly, the form shown in Figs. 6, 7, and 8 may be preferable as in service it is found that if the skin be stretched during the procedure, less than half the number of strokes of the plunger are needed to penetrate the barrier layer of the skin. The motor 14 is controlled by switch 12, which is the same as the switch used on electric hand drills and operates only when it is depressed.

To replace the roll of tape 36, cover plates 118 and 52 of the lateral housing sections D and E are removed, and the roll of used tape 38 is removed. Slip spring 40 and the now empty spool 36 are removed and the free end of tape from a new roll is wound onto the empty reel which is placed on hub 46 of ratchet 48. The new roll of tape 36 is placed on its mounting hub 37, the portion withdrawn therefrom being positioned below the end of the plunger 32. The slip spring 40 is replaced, and also covers 118 and 52.

In use, the machine is held by the hand-grip 10, the switch 12 is depressed, and the selected foot assembly is applied to the surface of the skin being treated. The operation is continued until a glistening surface appears on the skin, this indicating the point of complete removal of the water-salt barrier layer of the skin.

The construction herein illustrated and described represents a satisfactory embodiment of the apparatus of the instant invention, although it will be apparent that structural details may be subject to variation without departing from the inventive concept, as will become suggested to one skilled in the art, and accordingly, it will be understood that it is intended and desired to embrace within the scope of the invention such modifications and changes as may be necessary or desirable to adapt it to varying conditions and uses.

Having thus described our invention, what we claim as new and wish to secure by Letters Patent is:

1. A surgical skin-treating device, comprising an integral sectionalized housing and including a motor in one section of the housing, a vertically reciprocally operating tape-applying member in another portion of the housing and actuated by the motor, a pair of rolls mounted in additional sections of the housing oppositely off-set with respect to the tape-applying member, one of which rolls is a tape-supplying roll carrying tape having a side coated with a layer of pressure-sensitive adhesive, the other of which rolls is a tape-receiving roll for receiving the tape from the tape-supplying roll, portions of tape intermediate the rolls being successively engageable by the tape-applying member in downstroke movements thereof for applying successive portions of the pressure-sensitive adhesive coating on the tape to an area of live skin being treated, cooperating means on the tape-applying member and on the tape-receiving roll for operating the latter responsively to upward strokes of the tape-applying member to wind used tape on the tape-receiving roll, a foot member for the device engaging the area of skin being treated, and a hand grip for the device including a manually-depressible control switch for controlling operation of the motor.

2. A surgical skin-treating machine comprising an integral sectionalized housing and including a motor in one section of the housing, a vertically reciprocably operating tape-applying plunger in another portion of the housing and actuated by the motor, a pair of rolls mounted in additional sections of the housing oppositely off-set with respect to the plunger, one of which rolls is a tape-supplying roll carrying adhesive tape, the other of which rolls is a tape-receiving roll for receiving the tape from the tape-supplying roll, portions of tape intermediate the rolls being successively engageable by the plunger in downward movements thereof for applying successive portions of the tape to an area of skin being treated, a ratchet wheel having a hub portion thereof receiving the tape-receiving roll and defining a mounting therefor, a pawl pivotally mounted on the plunger engaging the ratchet wheel for operating the wheel responsively to upward movements of the plunger, a second pawl mounted adjacent to the ratchet wheel in engagement therewith for preventing reverse movements of the ratchet wheel, a slip spring in the tape-supplying roll to maintain the tape tensioned as it is supplied to the plunger, a foot assembly adjustably mounted on the housing for adjustably limiting engagement of the plunger with the area of the skin to be treated, a hand-hold for the housing for enabling manual manipulation of the housing, and a manually operative switch on the hand-hold for controlling operation of the motor.

3. A surgical apparatus as claimed in claim 2, wherein the tape-supplying roll is provided with a slip spring having means attaching the slip spring to the roll for eliminating slack in portions of tape intermediate the tape-supplying roll and the tape-receiving roll when the plunger is on its upstroke.

4. Surgical skin-treating apparatus as claimed in claim 2, wherein the foot assembly includes pivotally interconnected crossed links adjustably attached to opposite lower portions of the housings, skin-engaging foot members on the links engageable with skin to be treated, and tensioned spring means urging the links and foot members to a retracted position with respect to each other.

References Cited in the file of this patent
UNITED STATES PATENTS

| | | |
|---|---|---|
| 2,423,245 | Magnus et al. | July 1, 1947 |
| 2,435,278 | Hood | Feb. 3, 1948 |
| 2,480,252 | Magnus | Aug. 30, 1949 |
| 2,583,944 | Hirszson et al. | Jan. 29, 1952 |